United States Patent
Kirkpatrick et al.

(10) Patent No.: US 7,434,208 B2
(45) Date of Patent: *Oct. 7, 2008

(54) GRAPHICAL INTERFACE SYSTEM MONITOR PROVIDING ERROR NOTIFICATION MESSAGE WITH MODIFIABLE INDICATION OF SEVERITY

(75) Inventors: Mark Kirkpatrick, Conyers, GA (US); Darrin Morrow, Acworth, GA (US); John Strohmeyer, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/614,079

(22) Filed: Dec. 21, 2006

(65) Prior Publication Data

US 2007/0198908 A1    Aug. 23, 2007

Related U.S. Application Data

(63) Continuation of application No. 10/029,799, filed on Dec. 31, 2001, now Pat. No. 7,203,930.

(51) Int. Cl.
*G06F 9/44* (2006.01)
*G06F 11/00* (2006.01)
*G06F 3/00* (2006.01)

(52) U.S. Cl. .................. 717/131; 717/122; 717/125; 717/127; 714/57; 719/313

(58) Field of Classification Search ................. 717/131, 717/120–128, 175; 719/31, 313, 328; 714/57, 714/25, 5, 20, 4, 42
See application file for complete search history.

(56) References Cited

U.S. PATENT DOCUMENTS

| | | | |
|---|---|---|---|
| 6,363,503 B1 * | 3/2002 | Clauss et al. ................... | 714/57 |
| 6,593,940 B1 * | 7/2003 | Petersen et al. ............. | 715/700 |
| 6,718,535 B1 * | 4/2004 | Underwood ................ | 717/101 |
| 6,748,582 B1 * | 6/2004 | Chiles et al. ................ | 717/111 |
| 6,907,546 B1 * | 6/2005 | Haswell et al. ............... | 714/38 |
| 7,117,504 B2 * | 10/2006 | Smith et al. ................. | 719/328 |

(Continued)

OTHER PUBLICATIONS

Guleu, Ceke; "Log4j delivers control over logging", p. 1-10, URL <www.ibm.com/developerworks/jave/library/j-jw-log4j>, retrieved from scholar.google.com search Nov. 7, 2007.*

(Continued)

*Primary Examiner*—Wei Y. Zhen
*Assistant Examiner*—Satish S Rampuria
(74) *Attorney, Agent, or Firm*—Withers & Keys, LLC

(57) ABSTRACT

An interface is provided between a running computer application and a system monitor. The system monitor handles notification messages generated by the computer application. The interface includes an import module to scan a source file, extract notification messages from the source file and store the notification messages in a scan file. The interface includes a manager module to display each notification message in the scan file in a table in a graphical user interface to allow modifications to the data in the table. The data is exported to an export stage. The export module performs any translation required to create a file of the notification messages in a format that is acceptable to the system monitor.

13 Claims, 6 Drawing Sheets

U.S. PATENT DOCUMENTS 7,127,743 B1 *  10/2006  Khanolkar et al. ............ 726/23
7,168,012 B2 *   1/2007  Clauss et al. .................. 714/57
7,237,230 B2 *   6/2007  Underseth et al. ........... 717/127
7,280,955 B2 * 10/2007  Martin ......................... 703/23

OTHER PUBLICATIONS

Larsen, PG; Fitzgerald, JS; Brookes, TM; Green, MA: "Formal Modelling and Simulation in the Development of a Security-critical Message Processing System", p. 1-10, 1995, retrieved from scholar.google.com search Jan. 7, 2007.*

The network data delivery service: real-time data connectivity for distributed control applications, Pardo-Castellote, G.; Schneider, S.; 1994, IEEE, pp. 2870-2876 vol. 4.*

Model-based architecture for the Intranet, Hara, H.; Matsutsuka, T.; Kanaya, N.; Ookubo, T.; Uehara, S.; 1997, IEEE, pp. 182-187.*

* cited by examiner

| SEVERITY LEVEL IN TABLE | TRANSLATED SEVERITY LEVEL |
|---|---|
| 0 - 33 | LOW |
| 34 - 66 | MEDIUM |
| 67 - 99 | HIGH |

| SEVERITY LEVEL IN TABLE | TRANSLATED SEVERITY LEVEL |
|---|---|
| LOW | 15 |
| MEDIUM | 50 |
| HIGH | 84 |

GRAPHICAL INTERFACE SYSTEM MONITOR PROVIDING ERROR NOTIFICATION MESSAGE WITH MODIFIABLE INDICATION OF SEVERITY

This application is a continuation of application Ser. No. 10/029,799, filed on Dec. 31, 2001, now U.S. Pat. No. 7,203,930, and entitled SYSTEM AND METHOD FOR INTERFACING WITH A SYSTEM MONITOR.

BACKGROUND

1. Field of the Invention

The present invention relates generally to diagnostics in computer information systems. More specifically, the present invention relates to providing an interface to system monitors to facilitate creation and management of rule sets.

2. Background of the Invention

Computer monitors use alarms to indicate problems or error conditions with a running computer application. These monitor systems are commonly used on high availability systems and Internet servers. Monitor systems typically use rule sets to determine what constitutes a problem for a particular computer application. These rule sets are typically entered manually by an administrator, and require the administrator to enter each rule to be used. These rules can include message text, alarm behavior, files to scan and other information that the system monitor uses to determine how to process a particular alarm.

Custom computer applications have different requirements for generating alarms in response to problems or error conditions encountered during the application's execution. Because such custom responses to errors or other problem conditions are not known to conventional system monitors, they must be manually entered into a rules file that a system monitor can access to determine how to handle particular messages. Such manual entry is inefficient and prone to error.

Moreover, these requirements can change as an application matures. Thus, modification and/or enhancements to the computer application may require modifications in the rule sets used by the system monitor. These modifications would also require manual entry using conventional systems.

SUMMARY OF THE INVENTION

The present invention addresses the foregoing problems in the art by providing an interface to a system monitor to facilitate creation and management of rule sets used by the system monitor. In one aspect, the present invention analyzes a custom computer application to be monitored and generates changes to the rule sets used by the monitor system. Furthermore, the present invention incorporates a decision support interface to customize the rules to be used by the monitor system.

In one embodiment, the present invention is a system for interfacing to a system monitor. The system includes a source file corresponding to a computer application to be monitored. An import module in the system extracts notification messages from the source file and stores the notification messages in a scan file. A manager module in the system displays each of the notification messages stored in the scan file. The system can also include an export module to store data in a table in a format acceptable to the system monitor.

In another embodiment, the present invention is a method for interfacing to a system monitor. The method includes one or more of the following steps. First there is a step of scanning a source file of a computer application to be monitored for one or more notification messages. The method continues with the step of extracting the notification message from the source code file. The method continues with the step of displaying the notification message in a graphical user interface. Next, the method continues with the step of displaying a modifiable severity in the graphical user interface corresponding to the notification message. Next the method continues with the step of displaying a modifiable location where the notification messages are stored when generated by the computer application. The method then continues with the step of generating an export file in a format compatible with a system monitor, the export file comprising the modifiable severity and the modified location as modified in the previous steps.

BRIEF DESCRIPTION OF THE DRAWINGS

FIG. 2 is an exemplary mapping table for translating severity levels from a numerical representation to a textual representation.

FIG. 3 is an exemplary mapping table for translating severity levels from a textual representation to a numerical representation.

DETAILED DESCRIPTION OF THE INVENTION

Figure 1:
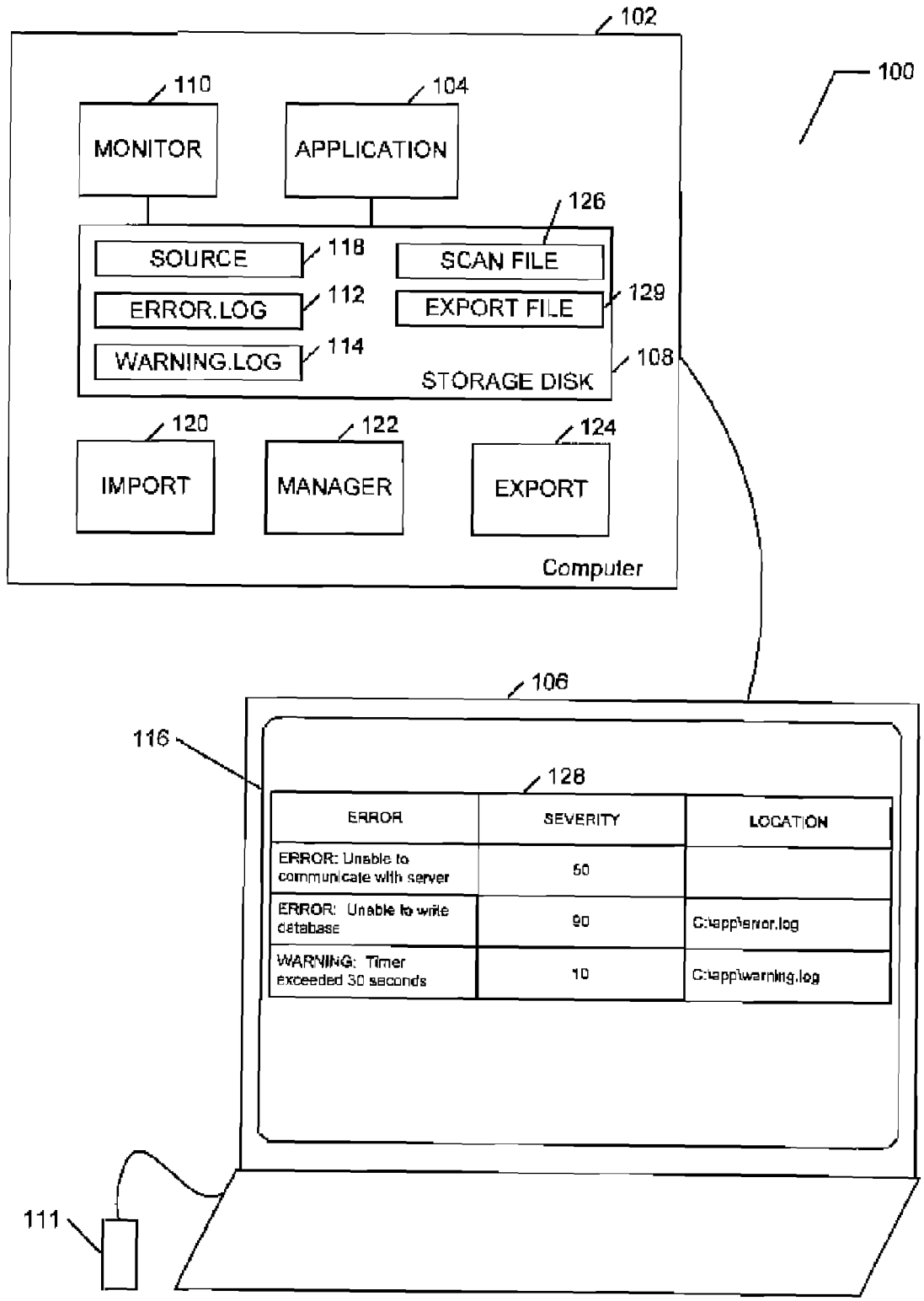
FIG. 1 is a schematic diagram of a system for providing an interface to a system monitor according to a preferred embodiment of the present invention.

FIG. 1 is a schematic diagram of a system 100 for providing an interface to a system monitor according to a preferred embodiment of the present invention. System 100 includes a computer 102 on which a computer application 104 is executing. System 100 also includes a display 106 and storage disk 108. Disk drive 108 is shown for purposes this description as an internal disk drive. It would be apparent to those skilled in the art that disk drive 108 can be an external disk drive.

A system monitor 110 monitors application 104 by analyzing an error file 112 and a warning file 114. Preferably, system monitor 110 is an application running on computer 102. Error file 112 and warning file 114 store error and warning log messages respectively. The error and warning messages are messages that would be generated by computer application 104 if an error event or other predetermined condition were to occur.

The present invention can include a manager for managing rule sets used by system monitor 110 to process alarm conditions. In one embodiment of the present invention, the process proceeds in three stages. The first stage is an import stage, the second stage is a manager stage, and the third stage is an export stage.

Figure 4:
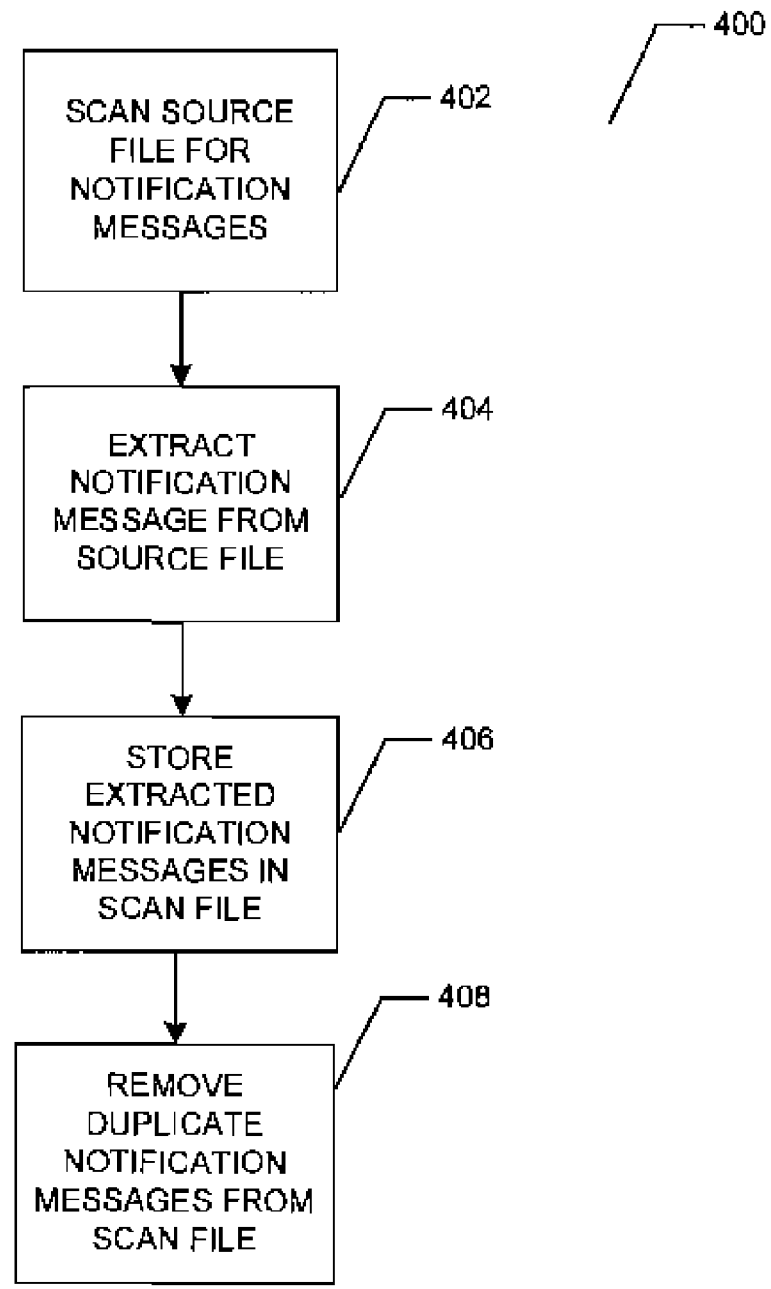
FIG. 4 is a flow diagram of a preferred embodiment of an import process in accordance with the present invention.

In the import stage, as shown in FIGS. 1 and 4, an import module 120 scans a source code file having the source code of a computer application to be monitored. In the present case, import module 120 scans source code file 118, which contains the source code associated with computer application 104. Import module scans source code file 118 for specific computer code that generates notification messages to system monitor 110, for example, by storage in error file 112 or warning file 114. Preferably, the scan is performed by searching for text indicative of error messages, warning messages or any other messages that are used to provide notification of problems with the running computer application.

Notification messages include any message that can provide notification of a problem in a running application. Import module 120 can search for all such messages or some subset, not including all, of the notification messages. For purposes of clarity only, only error and warning messages are discussed in this description. For example, in one embodiment, import module 120 searches for text in quotations that begins with the text "ERROR:" or "WARNING:".

The output of the import module 120's scan is a scan file 126. Scan file 126 includes each unique instance of an error or warning message that is generated by the running application when there is a problem, or there is a condition that might result in a problem. Any duplicates or error or warning messages are not stored. Alternatively, duplicates of any error or warning messages are removed in a duplicate removal step performed by import module 120 after scan file 126 is initially created.

After scan file 126 is created and duplicates are removed, whether by a second pass or as part of the initial scanning, a manager module 122 presents the contents of scan file 126 in a graphical user interface (GUI) 116 so that they can be modified if desired. Preferably, the GUI 116 can be a web-enabled graphical user interface. Web-enabling GUI 116 provides for remote accessibility. Furthermore, it reduces the requirements of any client displaying the graphical user interface. That is, display 106 can be hosted on a lightweight client that is distinct from computer 102.

Manager module 122 reads scan file 126, which is generated by import module 120. Preferably, in a scrolling window in GUI 116, manager module 122 displays a scrolling window with each line of the scrolling window corresponding to a notification message stored in scan file 126. Preferably, each line of the scrolling window comprises three columns.

The first column includes message text. The message text is the exact representation of the message as it would appear if it were generated by computer application 104.

The second column includes information related to a priority or severity of an alarm that is generated if the message is detected by system monitor 110. For example, the priority or severity may be represented by a number between 0 and 99 inclusive. A value of 0 indicates that no action is taken when the error message is encountered. That is, it is an error condition that can be ignored.

Severity levels are used by the system monitor to determine how to process error messages. For example, the severity level can indicate who is to receive a report that the error message occurred, how that person is to receive the report of the error message, for example by pager or some other communication method and when the person is to receive the report of the error message, for example, immediately, or at some other time.

Any number range could be used within the scope and spirit of the present invention. Moreover, the severity level can be represented by text. One such textual representation includes severity levels of "LOW", "MEDIUM" and "HIGH".

When the notification messages are displayed in GUI 116, preferably they are assigned a default severity level. For example, where the severity levels are represented by a range of values from 0 to 99, the default severity level is preferably 50. The default level can be determined by the particular system monitor used.

The value of the severity is modifiable. The value can be modified by a user of the present invention by selecting the severity level corresponding to a particular notification message. Preferably, this selection of the severity level that is to be modified is made using a pointing device, such as a computer mouse 111.

The third column includes information related to a location to use for monitoring. The location is a data file that is used for logging errors, warnings or other notification messages that are generated by the computer application. System monitor 110 reads this information to determine what to monitor, that is where to find the notification messages output by the computer application. The location information is modifiable. That is, a user can select a location corresponding to a particular notification message and then modify that the value of the location.

FIG. 1 illustrates an exemplary notification message table 128 according to an embodiment of the present invention. In this example, the notification messages in table 128 can have assigned severity levels in the range from 0 to 99, with a default value of 50. Line 1 of table 128 represents an exemplary new error message for the next release of computer application 104. The new error message is assigned the default severity level of 50. Because it is a new error message, no location is identified. The location must be entered for monitoring.

Line 2 illustrates another exemplary entry in table 128. In line 2, the severity is modified from the default value 50 to the value 90. This indicates that an error message of this type is very severe, and must be handled accordingly. Consequently, this modification changes the emergency response behavior and diagnostics for the condition present when this error message is detected by system monitor 110.

Line 3 illustrates another exemplary table entry in table 128. In this case, assume that the location was originally c:\data\warning.log. As shown in FIG. 1, the location is modified to c:\app\warning.log to maintain consistency with the error message location as shown in line 2.

A user can make any desired changed as described above. When the user has completed the changes, the user submits the modifications for export. An export module 124 generates an export file 129 from the data comprising table 128. Export file 129 is created in a format that can be used by system monitor 110. Alternatively, export file 129 is created in an arbitrary format, and later converted into a format that can be used by system monitor 110.

There are a variety of system monitors that can be used as system monitor 110. Some system monitors use text descriptions to represent severity levels. Other system monitors use numbers to represent severity levels. A configurable mapping mechanism translates the representation of the severity level into a format acceptable for the particular system monitor being used.

For example, if severity levels are described numerically in table 128, but represented textually in the system monitor being used, a mapping table is created to translate the numerical representation of table 128 to the textual representation compatible with the system monitor. An exemplary table 200 for translating severity levels from a numerical representation to a textual representation is illustrated in FIG. 2. In the example shown in FIG. 2, notification messages assigned a severity level of 0 to 33 in table 128 are translated to a severity level of LOW for the system monitor that used textual severity levels. Notification messages assigned a severity level of 34 to 66 in table 128 are translated to a severity level of MEDIUM for the system monitor that used textual severity levels. notification messages assigned a severity level of 0 to 33 in table 128 are translated to a severity level of HIGH for the system monitor that used textual severity levels.

FIG. 3 illustrates an exemplary translation mapping table 300 for severity levels that are described textually in table 128, but represented numerically in the system monitor being used. In the example shown in FIG. 3, notification messages assigned a severity level of LOW in table 128 are translated to a severity level of 15 for the system monitor that uses numerical severity levels. Notification messages assigned a severity level of MEDIUM in table 128 are translated to a severity level of 50 for the system monitor that used textual severity levels. Notification messages assigned a severity level of HIGH in table 128 are translated to a severity level of 84 for the system monitor that used textual severity levels.

FIG. 4 is a flowchart of an import method 400 for performing the import stage according to a preferred embodiment of the present invention. The method illustrated in FIG. 4 can be performed, for example, by import module 120. Import method 400 includes the step of scanning a source file for notification messages in step 402. The source file corresponds to the computer application to be monitored. Import method 400 continues in step 404 with the step of extracting notification messages from the source file. Import method 400 stores the notification messages in a scan file in step 406. In step 408, import method 400 removes any duplicate notification messages from the scan file.

Figure 5:
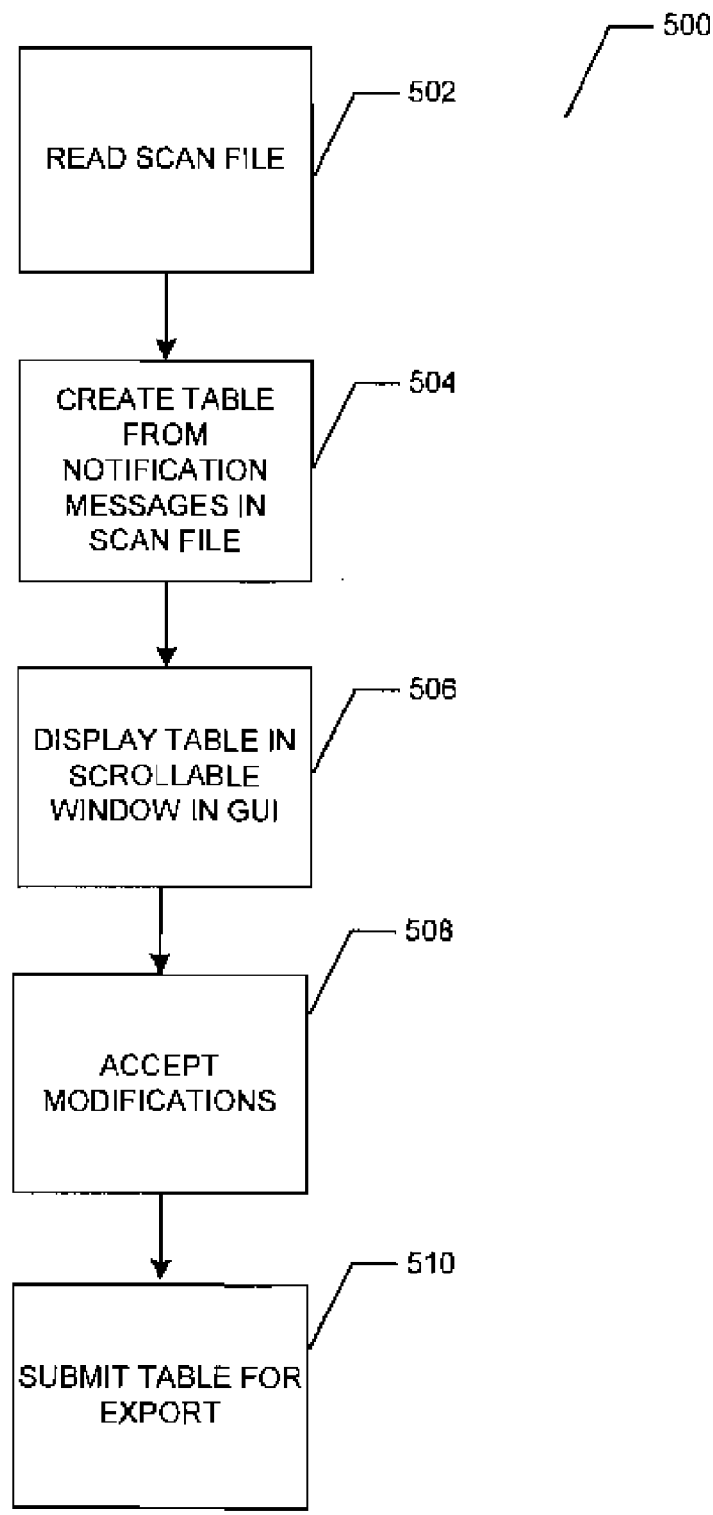
FIG. 5 is a flow diagram of a preferred embodiment of a scan process in accordance with the present invention.

FIG. 5 is a flowchart of a manager method 500 for performing the manager stage according to a preferred embodiment of the present invention. The method illustrated in FIG. 5 can be performed, for example, by manager module 122. Import method 500 includes the step of reading the scan file in step 502. In step 504, manager method 500 continues with the step of creating a table using each notification message stored in the scan file. Preferably, the table includes three columns, a notification message column, a severity level column and a location column. Preferably, values in the severity level and location columns are modifiable. These columns are described above with reference to FIG. 1. Manager method 500 continues in step 506 with the step of displaying each line of from the scan file in a scrolling window in a GUI. In step 508, manager method 500 continues with the step of accepting changes to the values stored in the table. In step 510, manager method 500 continues with the step of submitting the table for export.

Figure 6:
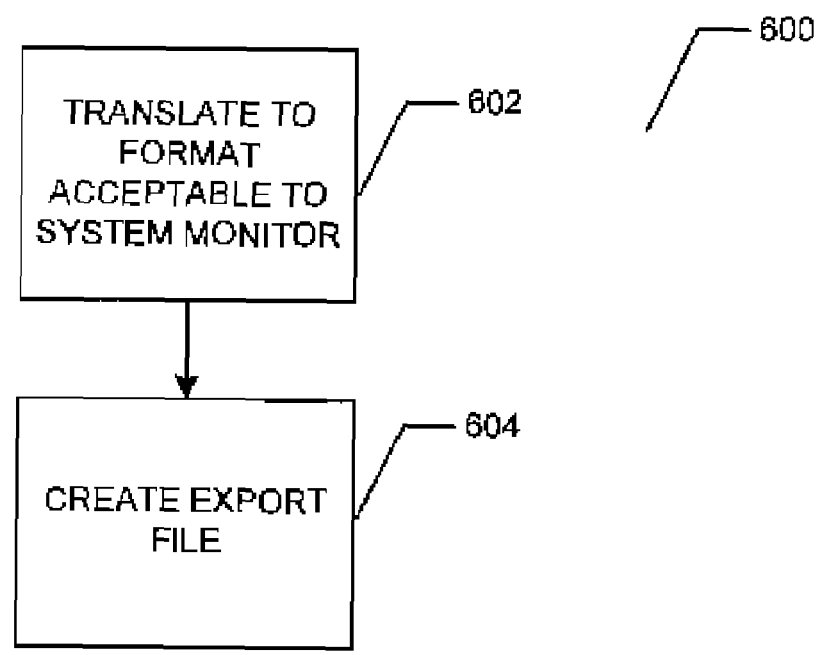
FIG. 6 is a flow diagram of a preferred embodiment of an export process in accordance with the present invention

FIG. 6 is a flowchart of an import method 600 for performing the import stage according to a preferred embodiment of the present invention. The method illustrated in FIG. 6 can be performed, for example, by export module 124. Import method 600 includes the step of translating the submitted table into a format that is acceptable to the system monitor that is used to monitor the computer application in step 602. Translation can include the steps of mapping the severity level from a numerical representation to a textual representation and vice versa. Export method 600 continues in step 604 with the step of creating an export file that comprises data from the table in a format that is acceptable to the system monitor.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for interfacing to a system monitor comprising:
   prior to executing a computer application within a computing device,
   (a) scanning a source file of the computer application resident in a storage device to be monitored for one or more notification messages that are contained within source code of the source file, the source file being stored in a first location;
   (b) extracting the one or more notification messages from the source code of the source file;
   (c) storing the one or more notification messages in a second location;
   (d) after storing the one or more notification messages in the second location, deleting any duplicate notification messages detected among the one or more notification messages extracted from the source code of the source file;
   (e) displaying the one or more notification messages in a graphical user interface rendered on a display device;
   (f) after displaying the one or more notification messages in the graphical user interface, associating and displaying a severity level corresponding to each of the one or more notification messages detected by the computer application, the severity level being modifiable by a user;
   (g) displaying in the graphical user interface a modifiable location data field that specifies a path to a storage location in a file system where actual notification messages that are generated by the computer application are stored when generated by the computer application;
   (h) generating an export file in a format compatible with the system monitor, the export file comprising the modifiable severity and the modifiable location; and
   (i) accessing the export file by the system monitor to find the one or more notification messages and to provide an indicator of the severity based on the modifiable severity level for the one or more notification messages discovered at the path specified by the modifiable location.

2. The method recited in claim 1, further comprising assigning a default value to the modifiable severity.

3. The method recited in claim 1, further comprising displaying the one or more notification messages, the modifiable severity and the modifiable location in a table in the graphical user interface.

4. The method recited in claim 1, further comprising modifying the modifiable severity, wherein the export file comprises the modified modifiable severity.

5. The method recited in claim 1, further comprising modifying the modifiable location, wherein the export file comprises the modified modifiable location.

6. The method recited in claim 1, further comprising:
(b1) storing temporarily the notification messages in a data file in a third location; and
(b2) extracting the notification messages from the data file for display in the graphical user interface.

7. The method recited in claim 1, further comprising translating a representation of the severity from numerical to textual to be compatible with the system monitor.

8. The method recited in claim 1, further comprising translating a representation of the severity from textual to numerical to be compatible with the system monitor.

9. A system for interfacing to a system monitor, comprising:
a computer system maintaining a source file corresponding to a computer application to be monitored that is stored at a first location, the source file containing source code that includes one or more notification messages embedded within the source code, wherein the computer system includes at least a computing device, a display device and a storage device;
an import module executing within the computing device to extract each of the one or more notification messages from the source file, to store each of the one or more notification messages in a scan file, and deleting any duplicate notification messages detected in the scan file;
a manager module to display each of the one or more notification messages stored in the scan file in a scrollable window of a table displayed within a graphical user interface rendered on the display device and to accept a user modifiable severity level and a user modifiable second location into the table, where the modifiable second location specifies a path to the second location where the one or more notification messages are stored by the computer system on the storage device;
an export module to store data in the table in a format acceptable to the system monitor; and
a system monitor module that accesses the data in the table and provides an indicator of severity based upon the modifiable severity level upon discovering the one or more notification messages at the second location.

10. The system recited in claim 9, further comprising means for modifying the data in the table.

11. The system recited in claim 9, further comprising means for for converting data in the table to the format acceptable to the system monitor module.

12. The system recited in claim 11, further comprising means for converting severity level data in the table from a text format to a numerical format.

13. The system recited in claim 11, further comprising means for converting severity level data in the table from a numerical format to a text format.

\* \* \* \* \*